INVENTOR.
Henry P. Keil

Jan. 6, 1959 H. P. KEIL 2,867,169
COMBINED MOISTENING AND CONTACT PRESSURE CONTROL
FOR LIQUID PROCESS DUPLICATING MACHINES
Filed March 18, 1954 9 Sheets-Sheet 3

INVENTOR.
Henry P. Keil
BY
Atty.

INVENTOR.
Henry P. Keil
BY Truhl Wells
Atty.

Jan. 6, 1959  H. P. KEIL  2,867,169
COMBINED MOISTENING AND CONTACT PRESSURE CONTROL
FOR LIQUID PROCESS DUPLICATING MACHINES
Filed March 18, 1954  9 Sheets-Sheet 6

Fig. 6.

INVENTOR.
Henry P. Keil
BY
Stukwells
Atty.

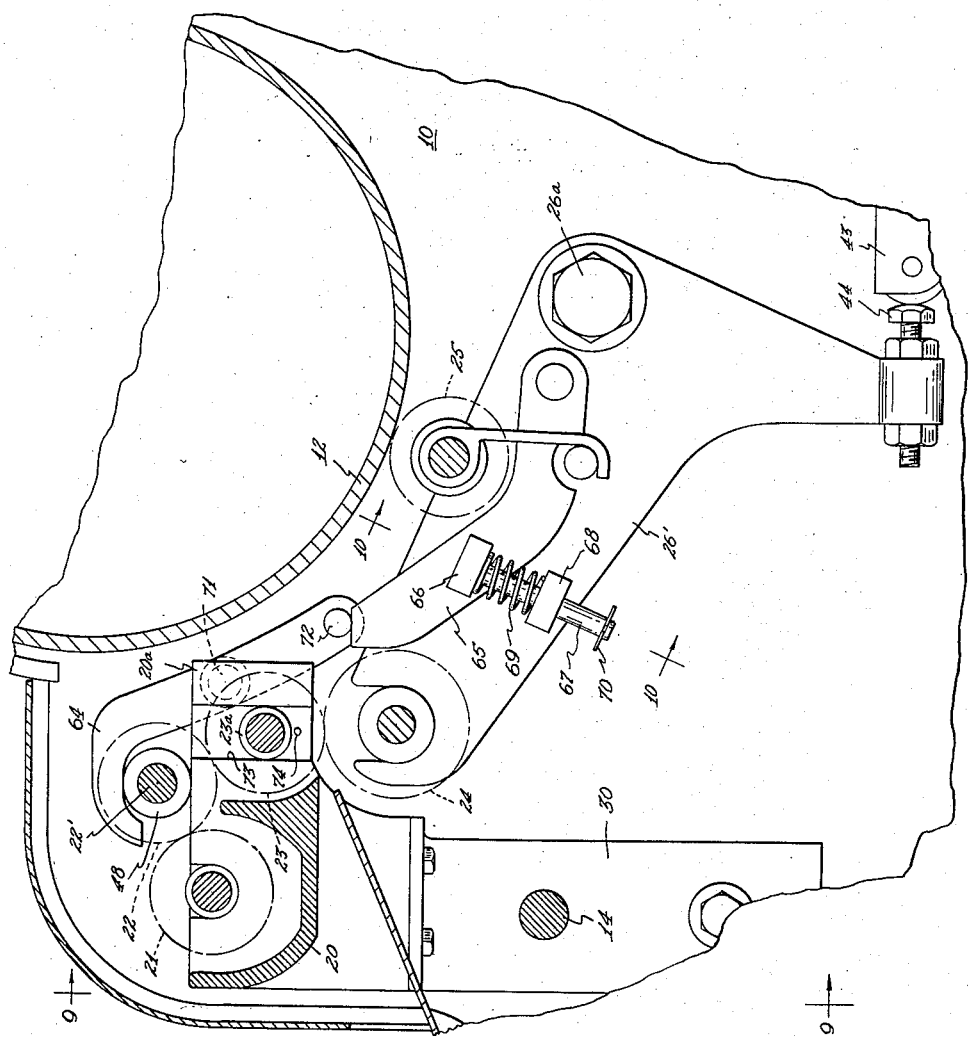

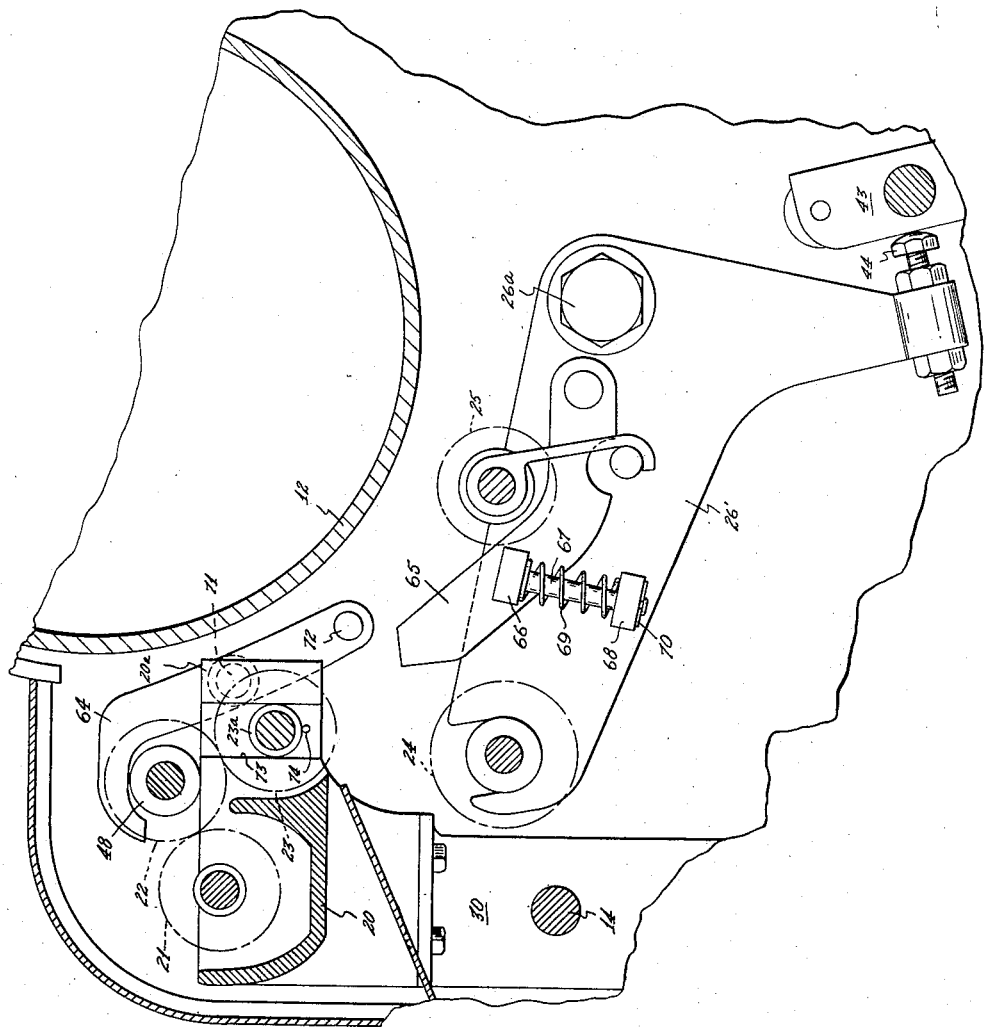

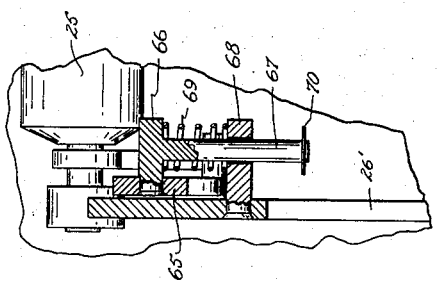
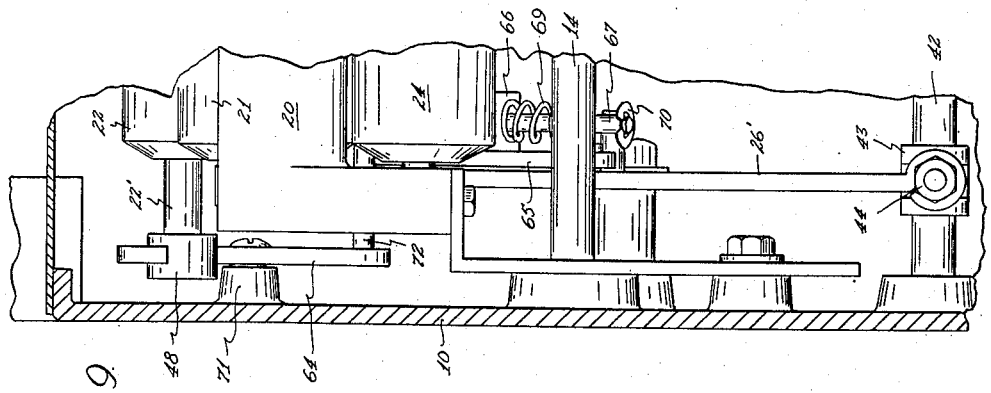

United States Patent Office 2,867,169
Patented Jan. 6, 1959

2,867,169

COMBINED MOISTENING AND CONTACT PRESSURE CONTROL FOR LIQUID PROCESS DUPLICATING MACHINES

Henry P. Keil, Chicago, Ill., assignor to The Fixture Hardware Corporation, Chicago, Ill., a corporation of Illinois Application March 18, 1954, Serial No. 417,030

6 Claims. (Cl. 101—132.5)

My invention relates to improvements in combined moistening and contact pressure control for liquid process duplicating machine. In machines of this character the master sheet printed in reserve with hectographic ink is placed on the drum and the copy sheets are moistened with a solvent for the ink and then pressed against the master sheet on the drum by a pressure roller so as to transfer the ink from the master sheet to the copy sheet. More or less brightness of copy is obtained by controlling the degree of moistening and the amount of pressure that is employed in pressing the copy sheet against the master sheet. It is the purpose of my invention to provide a novel means whereby a single control is utilized to vary both the moisture supply to the copy sheet and the pressure of the copy sheet against the master sheet.

My invention is embodied in a machine where the moisture is supplied from a liquid fountain to the copy sheet by a series of rollers, one of which is mounted in the fountain trough so as to be continuously wet with the liquid. A transfer roller engages the fountain roller and transfers a limited amount of liquid to a sheet moistening roller which directly engages the copy sheet. The moistening roller cooperates with another feed roller to advance the copy sheets to the drum and a pressure roller presses the copy sheets against the master sheet on the drum. By varying the pressure of the transfer roller against the fountain roller, the amount of moisture which is carried over by the transfer roller to the moistening roller can be changed. More pressure causes the transfer roller to carry over less moistue. By varying the pressure of the pressure roller against the drum more or less transfer of ink to the moistened copy sheet will occur. Increasing the pressure between the copy sheet and the master sheet increases the amount of ink transferred.

In making copies from a master sheet by this method, more copies can be taken from the master if sparse moistening and low pressure of the copy sheet against the master are used. The copies will be fainter or less bright when made this way. When a master has made a large number of copies it often becomes necessary to increase the moistening and the pressure between the copy sheet and the master sheet in order to obtain more satisfactory copies. With my invention, the same mechanism which brings the pressure roller against the drum also effects a yielding pressure engagement of the transfer roller with the fountain roller. In the preferred form of the invention the pressure of both the pressure roller against the drum and the transfer roller against the fountain roller are variable by a manual control lever through a simple and effective mechanism.

The nature and advantages of my invention will appear more fully from the following description and the accompanying drawings illustrating a preferred form of the invention. It should be understood however, that the drawings and description are illustrative only and are not intended to limit the invention except insofar as it is limited by the claims.

In the drawings:

Figure 6 is a sectional view taken substantially on the line 6—6 of Figure 5;

Figure 7 is a view like Figure 2 but illustrating a slightly different machine with a modified form of pressure control;

Figure 8 is a view like Figure 7 but showing the parts in changed position;

Figure 9 is a fragmentary sectional view taken substantially on the line 9—9 of Figure 7; and Figure 10 is a sectional view taken on the line 10—10 of Figure 7.

Figure 1:
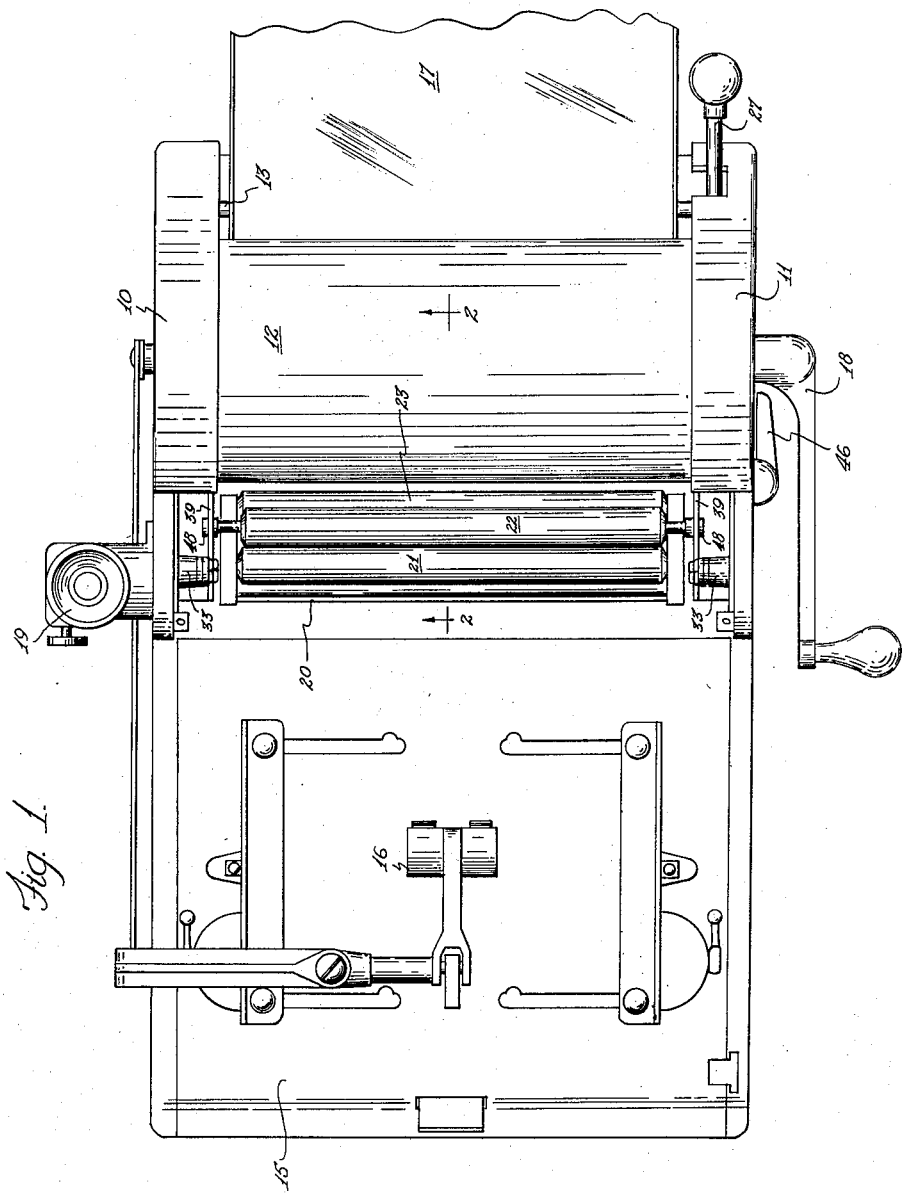
Figure 1 is a somewhat diagrammatic plan view of a duplicating machine embodying my invention.

Referring now in detail to the drawings, the duplicating machine shown comprises two side frame 10 and 11 which rotatably mount a drum 12. The side frames are connected together by cross tie rods, one of which is indicated at 13 in Figure 1 and the other of which is shown at 14 in the several figures. For the sake of clearness I have left off the showing of the master sheet clamp mechanism on the drum because it is of a well known type. Copy sheets are placed on a copy sheet tray 15 and are fed from the tray in timed relation to the drum by a feeding device 16 which is operated from the drum by the mechanism illustrated in Figure 1. The details of the copy sheet feeding mechanism form no part of the present invention so they are not described further herein. A sheet receiving tray 17 may be positioned beneath the drum to receive the copy sheets after they have been pressed against the master sheet on the drum to receive the impression. A handle 18 is shown for rotating the drum. The moistening liquid is supplied from a moistening liquid container through a connection indicated at 19 to a liquid fountain 20.

A fountain roller 21 is journalled in the fountain 20 and feeds liquid to a transfer roller 22 which is supported on the fountain roller 21 and a moistening roller 23. The moistening roller 23 cooperates with a pick up roller 24 to advance copy sheets fed to them from the feeding device 16. The advance copy sheets pass to the bight between the drum 12 and a pressure roller 25 which is adapted to press the copy sheets against the master sheet on the drum.

Figure 2:
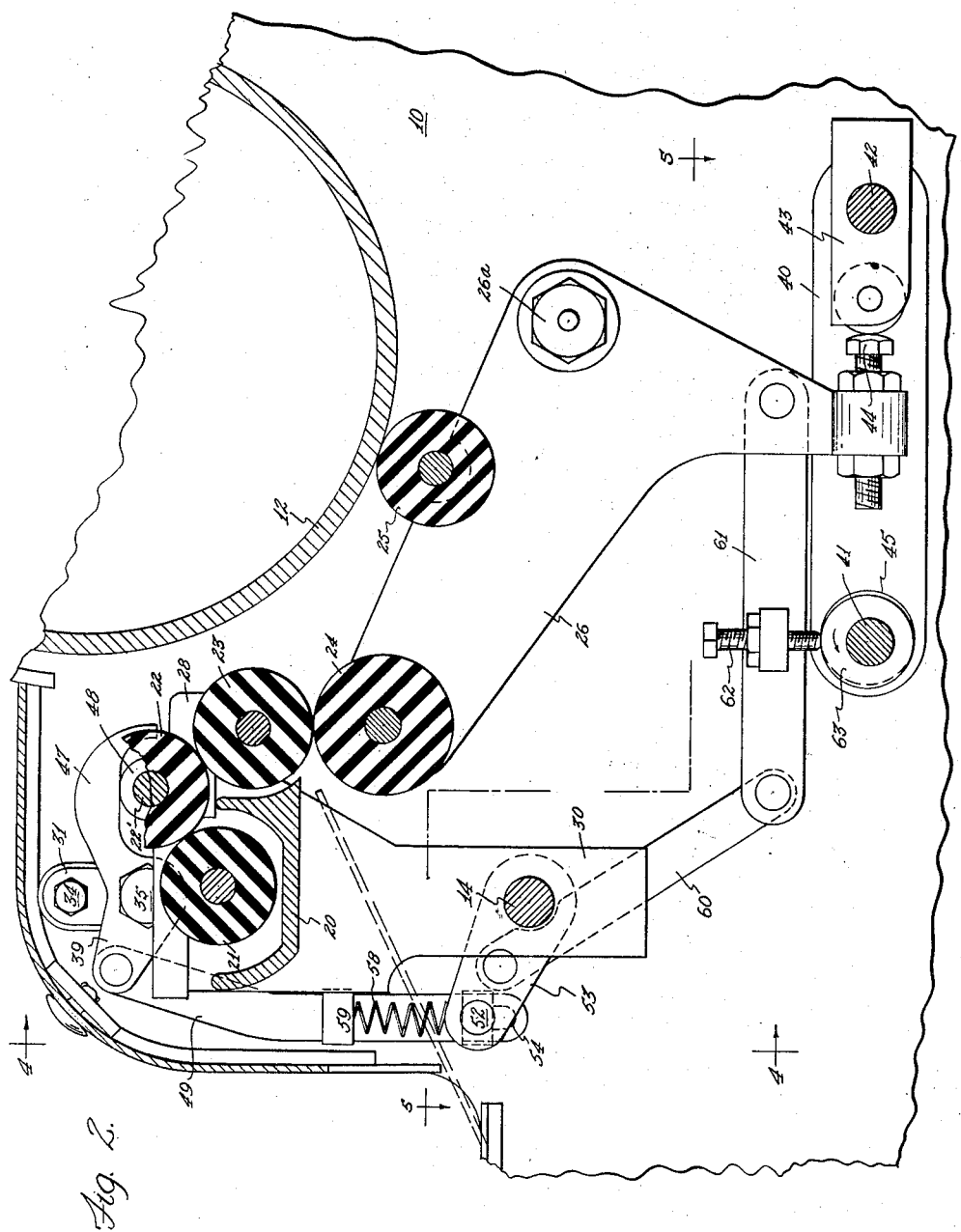
Figure 2 is an enlarged sectional view taken on the line 2—2 of Figure 1.
Figure 3:
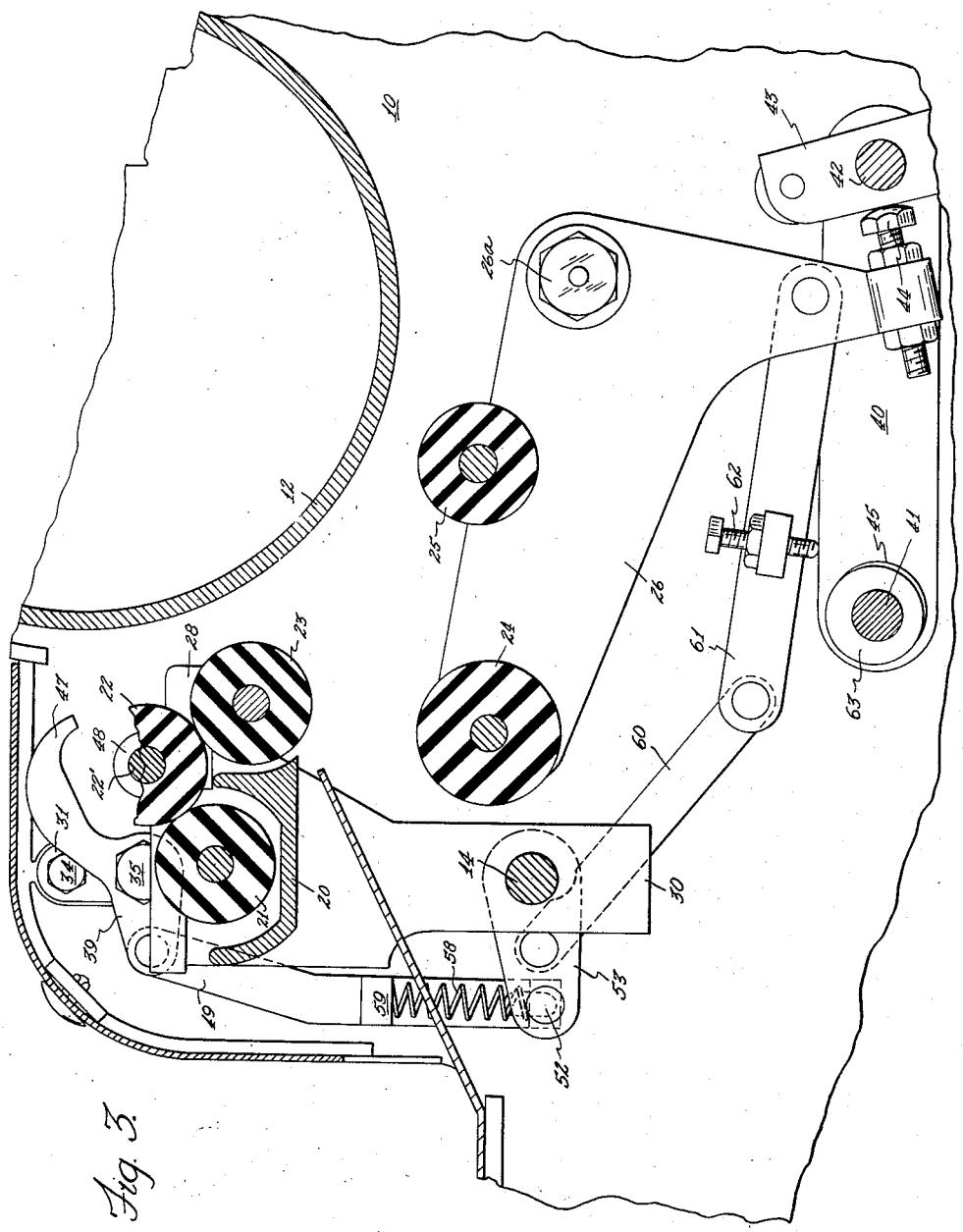
Figure 3 is a view like Figure 2, but showing the parts in a changed position.
Figure 4:
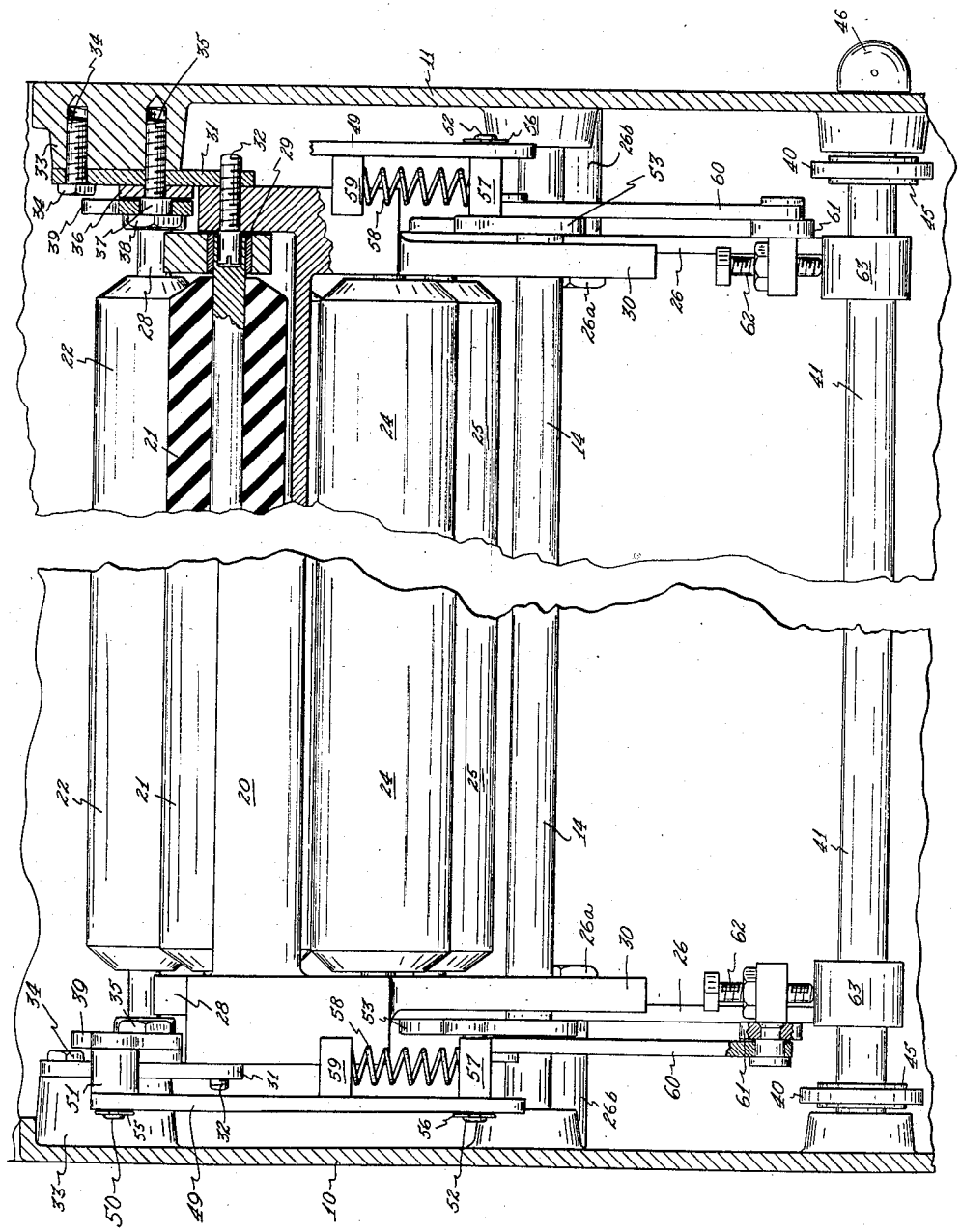
Figure 4 is a sectional view taken on the line 4—4 of Figure 2.
Figure 5:
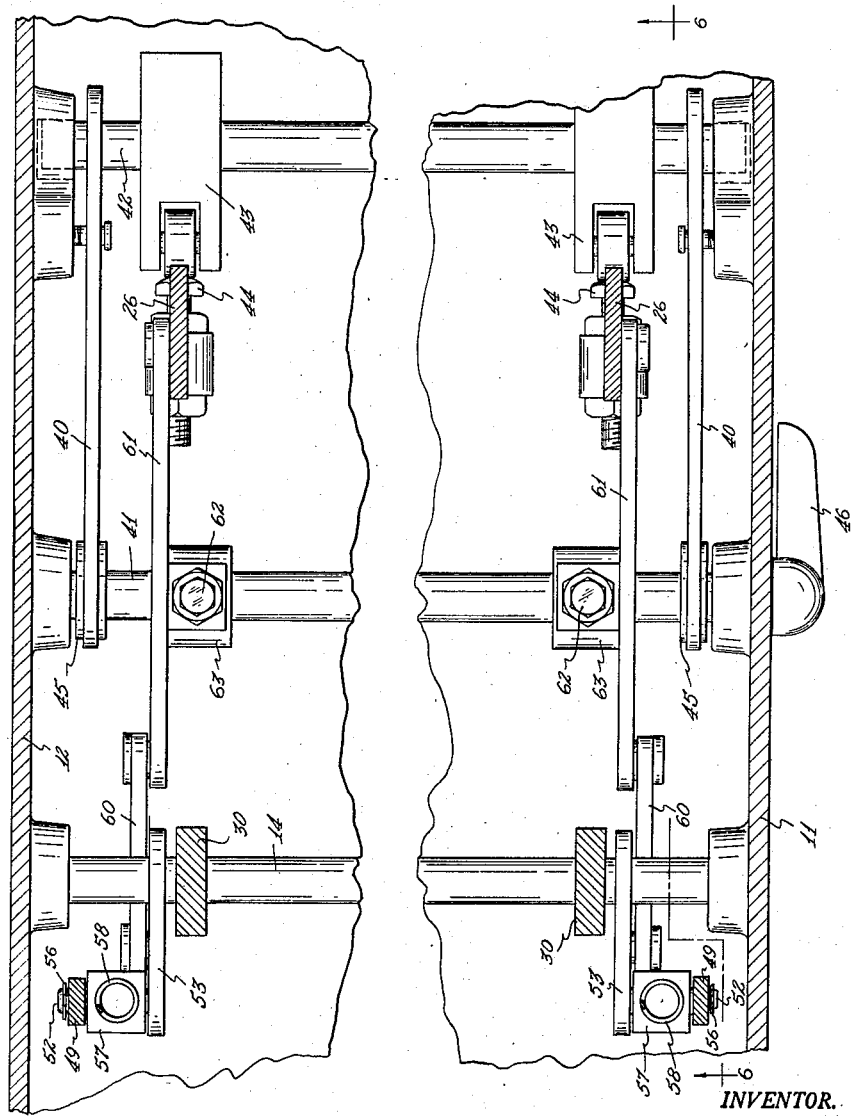
Figure 5 is a plan sectional view taken on the line 5—5 of Figure 2.

As illustrated best in Figures 2 and 3, the rollers 24 and 25 are carried by two levers 26 which have pivots 26a in bosses 26b on the frames 10 and 11. These levers 26 are adapted to move between the positions illustrated in Figures 2 and 3 under control of a hand lever 27 as illustrated in my prior application, Ser. No. 296,283, filed June 30, 1952, for Pressure Control for Duplicating Machines. The details of this operating mechanism have not been shown herein since they form no part of the present invention. The pick up roller 24, when it is moved up, is brought into engagement with the moistening roller 23. The moistening roller 23 is so mounted in the ends of the fountain 20 that it may move up and down. This mounting is illustrated in Figures 4 and 6 where the supports 28 for the roller 23 are shown. These supports 28 extend into the fountain 20 and are pivoted in the fountain on bearings 29 which also mount the fountain roller 21. The particular mounting for the fountain roller 21 and the moistening roller 23 is substantially the same as that shown in my prior application, Ser. No. 279,287, filed March 29, 1952, for Duplicating Machines. The fountain itself is mounted between the side frames 10 and 11 by depending legs 30 at the ends of the fountain which fit on the tie rod 14 and by suspension plates 31 which are secured to the fountain 20 by screws 32, the heads of which support the bearings 29. The upper ends of the plates 31 are secured on bosses 33 that are formed on the side frames 10 and 11. Two screws 34 and 35 secure each plate 31 to each boss 33. The lower screw 35 has a washer 36 around it. This screw also has an enlarged bearing portion 37 engaging the washer 36 and a head 38 which holds a pressure applying lever 39 on the bearing portion 37.

My improved control for the pressure of the roller 22 against the rollers 21 and 23 and the pressure of the roller 25 against the drum 12 utilizes the lever 39 and the lever 26 and connects them together in such a fashion that pressure adjustment of one lever to cause its roller to press more tightly results in movement of the other lever to reduce the pressure of the roller controlled by it. As shown in my prior application, Ser. No. 296,283, the pressure of the roller 25 toward the drum is controlled by links 40 which connect two cross shafts 41 and 42. The cross shaft 42 can move horizontally in the side frames 10 and 11. It carries the pressure applying members 43 which engage stops 44 at the lower ends of the levers 26. The links 40 ride on eccentric cams 45 which are fixed to the shaft 41. The shaft 41 has a hand lever 46 thereon outside the side frame 11 so that it may be turned to move the links 40 endwise and move the shaft 42 to shift the levers 26 about their fixed pivots 26a to increase or decrease the pressure of the roller 25 against the drum 12.

The levers 39 have hook portions 47 (see Figure 2) that overlie bearings 48 that are mounted on the ends of the shaft 22' of the roller 22. This shaft 22' extends over the supports 28 and is spaced from the supports so that the roller 22 is free to press against the rollers 21 and 23. When pressure is applied downwardly on the bearing 48 by the hook portions 47, the pressure of the roller 22 on the rollers 21 and 23 will be increased.

Each lever 39 is connected to a link 49 by a pivot pin 50 which is fixed to the lever 39. A spacer portion 51 on the pivot pin 50 spaces the link 49 outwardly toward the adjacent side frame from the end of the lever 39. Each link 49 extends downwardly and is pivoted on a pivot pin 52 which is mounted on one end of an arm 53. The arms 53 are pivoted on the cross tie rod 14. The links 49 have elongated slots 54 in their lower ends to receive the pivot pins 52. The links are held in place on the pivot pins 50 and 52 by split ring fasteners 55 and 56.

Each of the pivot pins 52 carries a spring seat 57 between the arm 53 and the link 49. These spring seats secure the lower ends of springs 58. The upper ends of the springs 58 seat in spring seats 59 that are fixed to the links 49. It is evident that as the arms 53 move upwardly about their pivots on the rod 14, they will tend to compress the springs 58. The springs 58 will exert a lifting force on the links 49 to turn the levers 39 in a direction to apply more pressure on the bearings 48 at the ends of the roller 22. When the arm 53 is lowered about its pivot, this reduces the pressure on the bearings 48 to effect reduction in pressure between the rollers 21 and 22.

Means are provided whereby actuation of the hand lever 46 and consequent rotation of the shaft 41 will move the arm 53 in the proper direction to effect a change in the pressure between the rollers 21 and 22 as the pressure changes between the pressure roller 25 and the drum. These means comprise a link 60 which is pivoted to the arm 53 intermediate its ends, a second link 61 pivoted to the link 60 and to the lower portion of the lever 26, an adjustable bearing member 62 on the link 61 and a cam 63 on the shaft 41 on which the bearing member 62 is adapted to ride. The cam 63 is so positioned with respect to the cam 45 that when the cam 45 is turned in a direction to move the link 40 to apply more pressure on the pressure roller 25 against the drum, the cam 63 moves to lower the arm 53 to cause less upward pressure on the link 49, thus lowering the pressure of the member 39 downward on the roller 22. This action is illustrated best by comparison of Figures 2 and 6. In Figure 2, the cam 45 is so positioned as to provide minimum pressure of the roller 25 against the drum 12. The highest point on the cam 45 is facing toward the right which means that the link 40 has been moved to the right as far as it can be moved by the cam 45, and, the member 43 and stop 44 have been likewise moved to the right. In this position the cam 63 has its highest point directly upward so that the links 60 and 61 have lifted the arm 53 to its uppermost position so as to apply maximum pressure through the link 49, the lever 39, the portion 47 of the lever 39 and the bearing 48 upon the roller 22. By turning the shaft 41 one hundred and eighty degrees in a counter clockwise direction as shown in Figure 2, the high side of the cam 45 will be moved to the left hand side of the shaft 41 and the high side of the cam 63 will be moved to a point directly beneath the shaft 41. Figure 6 illustrates the two positions of the cam 63 and the resulting movement of the links 60 and 61 and the arm 53. The spring 58 is thus extended more and therefore communicates less pressure through the link 49 and the member 39 to the roller 22.

The adjustable bearing member 62 and the adjustable stop members 44 are correctly adjusted in the assembly and testing of the machine to provide proper pressure of the transfer roller against the fountain roller 21 and proper pressure of the roller 25 against the drum 12. The manual adjustment provided through the manipulation of the single control lever 46 then is sufficient to provide adequate moistening control and pressure control for producing copies of the desired brightness. The particular advantage of this mechanism lies in the fact that the change in moistening is immediately responsive to the adjustment. The rollers 21, 22, 23 and 24 turn in the directions indicated by the arrows in Figure 2 when duplicating operations are being carried on. The solvent liquid is carried up by the fountain roller 21 to its line of contact with the transfer roller 22. A certain amount of liquid is transferred to the surface of the roller 22 and carried over this roller to the roller 23 which in turn carries the liquid down to the copy sheet passing between it and the roller 24. The liquid film carried over on the roller 22 is decreased in amount by increasing the pressure between the roller 21 and the roller 22. Therefore as soon as an adjustment is made to increase or decrease the pressure of the roller 25 against the drum, a corresponding adjustment is made in the amount of moisture that will be transmitted by the roller 22 from the fountain roller 21 to the moistening roller 23.

The mechanism hereinbefore described is convenient also in releasing the pressure of the rollers upon each other since the adjustments set are not affected when the hand lever 27 is shifted to drop the pressure roller 25 away from the drum. When the pressure roller 25 is moved away from the drum as illustrated in Figure 3, the link 61 pulls the link 60 to the right to move the arm 53 down far enough to cause the link 49 to lift the member 39 into the position shown in Figure 3. This removes all pressure between the rollers 21, 22 and 23 except the weight of the roller 22. In this position of the mechanism the roller 22 is free to be removed and the rollers 21 and 23 can also be lifted out in the same manner as they are lifted out in my prior application identified hereinbefore.

In the modified form of the invention shown in Figures 7 to 10, the same reference numerals have been utilized to identify the drum and the several rollers. In this form of the invention, however, a modified construction is utilized to interconnect the lever 26' that carries the pressure roller 25 and the lower feed roller 24 with a lever 64 that is utilized to apply pressure between the transfer roller 22 and the rollers 21 and 23. Each of the levers 26' has an arm 65 pivoted thereto. The arm 65 has a spring seat 66 thereon which also carries a spring guide rod 67. The second spring seat 68 is mounted on the lever 26'. A spring 69 is mounted between the seats around the rod 67. The rod 67 has a stop washer 70 at its free end to limit the upward movement of the arm 65 with respect to the lever 26'. The lever 64 is pivoted on a boss 71 in the adjacent side frame 10 or 11. A pin 72 is fixed to the lower end of the lever 64 in position to be engaged by the free end of the arm 65. In this form of the invention when the parts are in the position shown in Figure 7, the arm 65 engages the pin 72 and exerts an upward force which tends to rock the lever 64 about its pivot and causes the lever to exert a downward pressure on the bearing 48 on the shaft 22' of the transfer roller 22. This crowds the transfer roller 22 against the fountain roller 21 to provide the proper pressure between the rollers 21 and 22 for controlling the transfer of liquid to the moistening roller 23.

In this machine there is no manual adjustment of the pressure but the levers 26' may be dropped down to relieve the pressure of the roller 25' against the drum 10 as illustrated in Figure 8. When this is done, the levers 64 are of course, freed of pressure of the arm 65 so as to leave the rollers 21, 22 and 23 subject only to the weight of the roller 22 bearing down on the other two rollers. The roller 23 is free to move upward in a slot 73 which is formed in the end portions 20a of the fountain 20. Pins 74 limit the downward movement of the roller 23 by engaging the bearing 23a for this roller.

It is believed that the nature and advantages of my invention will be apparent from the foregoing description.

Having thus described my invention, I claim:

1. In a duplicating machine having a rotatable drum for carrying a master sheet, a yieldable pressure roller positioned to press copy sheets against the master sheet, a moistening roller and a feed roller cooperating to moisten and to feed copy sheets between the drum and pressure roller, a liquid containing fountain, a fountain roller therein, a transfer roller riding on the fountain roller and engaging the moistening roller and applying a limited liquid coating of liquid thereto for moistening the copy sheets, supports for said pressure roller movable toward and away from the drum to vary the engaging pressure of a copy sheet and a master sheet passing between the pressure roller and the drum, a manually operable member operably connected to the supports to increase and decrease the pressure of the pressure roller against the drum, and connections between said member and the transfer roller operable to decrease the pressure of the transfer roller on the fountain roller in response to increased pressure of the pressure roller on the drum.

2. In a duplicating machine having a rotatable drum for carrying a master sheet, a yieldable pressure roller positioned to press copy sheets against the master sheet, a moistening roller and a feed roller cooperating to moisten and to feed copy sheets between the drum and pressure roller, a liquid containing fountain, a fountain roller therein, a transfer roller riding on the fountain roller and engaging the moistening roller and applying a limited liquid coating of liquid thereto for moistening the copy sheets, supports for said pressure roller movable toward and away from the drum to vary the engaging pressure of a copy sheet and a master sheet passing between the pressure roller and the drum, a manually turnable shaft, a cam on said shaft, means engaging the cam and operable thereby upon rotation of the shaft in one direction to cause the supports to move the pressure roller toward the drum, a second cam on said shaft, and means engaging the second cam and operable thereby upon said rotation of the shaft in said direction to reduce the pressure of the transfer roller on the fountain roller.

3. In a duplicating machine having a rotatable drum for carrying a master sheet, a yieldable pressure roller positioned to press copy sheets against the master sheet, a moistening roller and a feed roller cooperating to moisten and to feed copy sheets between the drum and pressure roller, a liquid containing fountain, a fountain roller therein, a transfer roller riding on the fountain roller and engaging the moistening roller and applying a limited liquid coating of liquid thereto for moistening the copy sheets, supports for said pressure roller movable toward and away from the drum to vary the engaging pressure of a copy sheet and a master sheet passing between the pressure roller and the drum, means at the ends of the transfer roller yieldingly pressing it against the fountain roller to control the amount of liquid transferred from the fountain roller to the moistening roller, and a manually operable member operably connected to said pressure roller supports and to the yieldingly pressing means at the ends of the transfer roller and operable simultaneously to move the supports toward the drum and to reduce the pressure of said transfer roller on the fountain roller.

4. In a duplicating machine having a rotatable drum for carrying a master sheet, a yieldable pressure roller positioned to press copy sheets against the master sheet, a moistening roller and a feed roller cooperating to moisten and to feed copy sheets between the drum and pressure roller, a liquid containing fountain, a fountain roller therein, a transfer roller riding on the fountain roller and engaging the moistening roller and applying a limited liquid coating of liquid thereto for moistening the copy sheets, supports for said pressure roller movable toward and away from the drum to vary the engaging pressure of a copy sheet and a master sheet passing between the pressure roller and the drum, means at the ends of the transfer roller yieldably pressing it against the fountain roller to control the amount of liquid transferred from the fountain roller to the moistening roller, and a manually operable member operable simultaneously to move the supports toward the drum and to reduce the pressure of said transfer roller on the fountain roller, said member comprising a shaft having two cams thereon operably connected to the supports for moving them and two other cams thereon operably connected to said last named means.

5. In a duplicating machine having a rotatable drum for carrying a master sheet, a yieldable pressure roller positioned to press copy sheets against the master sheet, a moistening roller and a feed roller cooperating to moisten and to feed copy sheets between the drum and pressure roller, a liquid containing fountain, a fountain roller therein, a transfer roller riding on the fountain roller and engaging the moistening roller and applying a limited liquid coating of liquid thereto for moistening the copy sheets, supports for said pressure roller movable toward and away from the drum to vary the engaging pressure of a copy sheet and a master sheet passing between the pressure roller and the drum, said supports comprising rock levers carrying the pressure roller and the feed roller, a shaft having means to shift the rock levers between an inoperative position where they hold the pressure roller spaced from the drum and an operative position where they press the pressure roller against the drum, levers pivoted at the ends of the fountain and having hook portions riding on the ends of said transfer roller for pressing it against the fountain roller to control the amount of liquid transferred from the fountain roller to the moistening roller, means engaging the last named levers and connected to said rock levers to apply pressure on the transfer roller when the pressure roller is moved against the drum, and a common control means operable simultaneously to adjust the rock levers toward the drum and to vary the pressure of the transfer roller against the fountain roller.

6. In a duplicating machine having a rotatable drum for carrying a master sheet, a yieldable pressure roller positioned to press copy sheets against the master sheet, a moistening roller and a feed roller cooperating to moisten and to feed copy sheets between the drum and pressure roller, a liquid containing fountain, a fountain roller thereby, a transfer roller riding on the fountain roller and engaging the moistening roller and applying a limited liquid coating of liquid thereto for moistening the copy sheets, supports for said pressure roller movable toward and away from the drum to vary the engaging pressure of a copy sheet and a master sheet passing between the pressure roller and the drum, levers pivoted at the ends of the fountain and having hook portions riding on bearings at the ends of said transfer roller, links pivoted to said levers and depending from them, rocker arms pivoted on fixed pivots beneath the fountain, the links having lost motion connections to said arms, springs urging the links upward with respect to the arms, a hand lever, means operable by said hand lever to move the arms up and down and thereby vary the upward force of said springs on the links, and means operably connecting said hand lever to the pressure roller supports to move the supports toward and away from the drum.

References Cited in the file of this patent

UNITED STATES PATENTS

| | | |
|---|---|---|
| 2,221,634 | Ford | Nov. 12, 1940 |
| 2,231,639 | Ritzerfeld | Feb. 11, 1941 |
| 2,262,511 | Morrison | Nov. 11, 1941 |
| 2,597,804 | Keil | May 20, 1952 |
| 2,745,340 | Ritzerfeld | May 15, 1956 |